(12) United States Patent
Price

(10) Patent No.: US 7,601,653 B2
(45) Date of Patent: *Oct. 13, 2009

(54) ADHESIVE GRIP LINER

(75) Inventor: Shelley W. Price, Vermilion, OH (US)

(73) Assignee: Shurtech Brands LLC, Avon, OH (US)

( * ) Notice: Subject to any disclaimer, the term of this patent is extended or adjusted under 35 U.S.C. 154(b) by 346 days.

This patent is subject to a terminal disclaimer.

(21) Appl. No.: 11/347,931

(22) Filed: Feb. 6, 2006

(65) Prior Publication Data

US 2006/0127628 A1 Jun. 15, 2006

Related U.S. Application Data

(63) Continuation-in-part of application No. 10/983,863, filed on Nov. 8, 2004, which is a continuation of application No. 09/891,568, filed on Jun. 26, 2001, now Pat. No. 6,911,406.

(51) Int. Cl.
*B32B 27/12* (2006.01)
*B32B 27/04* (2006.01)

(52) U.S. Cl. ............... 442/2; 442/38; 442/41; 442/43; 442/45; 442/46; 442/49; 442/50; 442/58

(58) Field of Classification Search ............ 442/2, 442/38, 41, 43, 45, 46, 49, 50, 58
See application file for complete search history.

(56) References Cited

U.S. PATENT DOCUMENTS

| 4,039,705 | A | 8/1977 | Douek |
|---|---|---|---|
| 4,316,926 | A | 2/1982 | Kaminstein |
| 4,380,564 | A | 4/1983 | Cancio |
| 5,599,617 | A | 2/1997 | Ewald |
| 6,130,174 | A | 10/2000 | Hawley |
| 6,238,762 | B1 | 5/2001 | Friedland |
| 6,911,406 | B2 | 6/2005 | Sobonya |
| 2002/0094404 | A1 | 7/2002 | Schottenfeld |
| 2002/0145089 | A1 | 10/2002 | Calkins |
| 2002/0192416 | A1 | 12/2002 | Hawley et al. |
| 2004/0038607 | A1 | 2/2004 | Williamson |
| 2005/0037190 | A1 | 2/2005 | Browne |
| 2005/0130518 | A1 | 6/2005 | Sobonya |

*Primary Examiner*—Ula C Ruddock
(74) *Attorney, Agent, or Firm*—Fay Sharpe LLP; Karl W. Hauber

(57) ABSTRACT

An adhesive grip liner is provided which comprises a composite sheet material, an adhesive, and a release liner. The composite sheet material comprises a scrim embedded in a foamed resin. The adhesive contacts a bottom surface of the composite sheet and the release liner contacts the adhesive. The top surface has non-skid and non-adhesive properties. The adhesive grip liner is useful for lining horizontal surfaces, such as a shelf, and vertical surfaces, such as a rail cushion.

25 Claims, 3 Drawing Sheets

ADHESIVE GRIP LINER

REFERENCE TO PRIOR APPLICATIONS

This application is a continuation-in-part of U.S. application Ser. No. 10/983,863, filed Nov. 8, 2004, which is a continuation of U.S. application Ser. No. 09/891,568, filed Jun. 26, 2001, now U.S. Pat. No. 6,911,406.

FIELD OF THE INVENTION

The invention relates to a sheet material useful as a drawer liner, shelf liner, appliance underlayment or the like.

BACKGROUND OF THE INVENTION

Sheet materials and in particular, drawer liners and shelf liners have been made utilizing scrim and foamed plastic. One type of shelf liners and drawer liners has been made by providing a foamed plastic coating on an open scrim. The scrim coated with the foamed plastic is porous and has openings, which pass from one surface to the other. To provide a smooth sheet material, a smooth film of a non-foamed plastic is laminated over one surface of the scrim coated with the foamed plastic. The foam plastic coated scrim acts as a non-slip base for the shelf liner or drawer liner. Composite sheet materials of this type are disclosed in U.S. Pat. No. 6,130,174, the contents of which are incorporated herein by reference in their entirety.

A sheet material formed from a scrim and a laminated smooth surface layer is complex to form since it requires that a layer of smooth material be laminated to the scrim which has first been coated with the foamed plastic.

Another type of shelf liner or drawer liner laminate is disclosed in U.S. Pat. No. 5,854,144, the contents of which are incorporated herein by reference in their entirety. In the composite structure, a layer of closed foam plastic is coated and foamed to one surface of a scrim and a smooth film laminated to the opposite side of the scrim.

Another shelf liner is disclosed in U.S. Pat. No. 6,130,174, the contents of which are incorporated herein by reference in their entirety. A material with nonslip characteristics on one side and a smooth surface on the other side is provided by laminating together a smooth film and a plastic foam surrounding a scrim having nonslip characteristics.

All of the composite sheet materials described above require lamination of a smooth film to a base structure to form a suitable top surface to the composite sheet.

BRIEF DESCRIPTION OF THE INVENTION

The invention is an adhesive grip liner useful as a drawer liner or shelf liner which comprises a foam sheet material, an adhesive layer, and a release liner. The grip liner is a commercial consumer product. In specific embodiments, the foam sheet is a composite sheet material comprising a scrim impregnated with (embedded in) a continuous layer of a foamed resin.

The foamed resin covers at least both surfaces of the scrim. The foamed resin does not have open pores extending from a first side of the scrim to a second side of the scrim. The scrim is preferably completely covered by or encased in the foamed resin. The resulting composite sheet material has a top surface and a bottom surface. It may be resilient when pressure is applied to it.

The top surface of the composite sheet material has non-skid and non-adhesive characteristics. The top surface may be continuous, or smooth, but may also display the underlying weave pattern of the scrim. An attractive decorative effect can be obtained depending upon the weave of the scrim. In addition, a decorative effect can be obtained or enhanced by providing a surface which is colored, printed or embossed or decorated with a design. If desired, the top surface may be discontinuous and one or more holes or other apertures may be formed on the top surface. Such apertures may extend completely through the composite sheet material. The bottom surface may also be smooth or display the underlying weave pattern of the scrim.

An adhesive connects to the bottom surface of the composite sheet material. The adhesive is preferably a pressure-sensitive adhesive. The adhesive can be selected to be permanent, removable, repositionable, or otherwise as desired. In some embodiments, the adhesive contacts the bottom surface of the composite sheet material. The adhesive is applied to the bottom surface so that the resulting surface formed by the adhesive is generally smooth. The adhesive may be applied by use of a transfer coating, in which the adhesive is applied to a liner and then affixed to the bottom surface. The liner may then be peeled away to expose the adhesive.

A disposable liner with a release coating, or release liner, is applied to the bottom surface of the composite sheet material with the adhesive engaging the release coating. The release liner thereby protects the adhesive.

In specific embodiments, a vinyl film may first be joined to the bottom surface of the composite sheet material. The adhesive then contacts this film layer. The vinyl film helps provide a smooth adhesive layer and prevents color transfer between the grip liner and the surface it is applied to. It may also provide a solid film barrier between the adhesive layer and the composite sheet material, so that any debris or crumbs falling through apertures in the composite sheet do not stick to the adhesive layer.

The adhesive grip liner has particular utility as a covering to protect and/or improve the appearance of a horizontal surface (e.g., a shelf or drawer liner). It may also be used for mounting on a vertical surface (e.g., to cushion a rail) or applied directly to another material, such as a felt pad, to create a material having a non-skid, non-adhesive surface.

The top surface of the adhesive grip liner (and therefore the composite sheet material) is preferably impervious to water and may be readily wiped clean of dirt and other undesirable residues. Additionally, in embodiments without holes or apertures, the surface to which it is applied is protected against water and the accumulation of crumbs and other debris, due to the complete lack of any open apertures. The non-adhesive characteristic of the top surface allows an object to be placed upon the top surface, then easily picked and removed. The non-skid characteristic of the top surface prevents an object placed on it from easily sliding or skidding laterally across the top surface. Further, the foamed character of the adhesive grip liner provides a cushioning effect when objects are placed on it. The adhesive nature of the bottom surface of the adhesive grip liner prevents the liner from bunching, for example at the back of a drawer, or unintentionally moving.

A BRIEF DESCRIPTION OF THE DRAWINGS

DETAILED DESCRIPTION OF THE INVENTION

Figure 1:
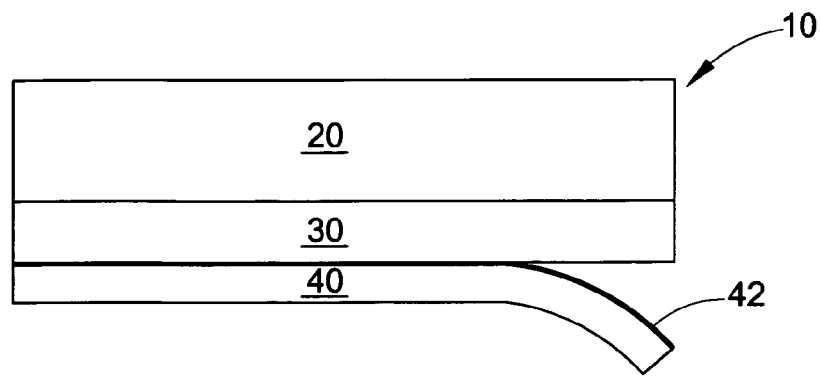
FIG. 1 is a cross-sectional depiction of one embodiment of an adhesive grip liner.

A more complete understanding of the adhesive grip liner can be obtained by reference to the accompanying drawings. These Figures are merely convenient schematic representations and are not intended to indicate the relative size or dimensions of the various layers. Although specific terms are used in the following description for the sake of clarity, these terms are intended to refer only to the particular structure of the embodiments illustrated in the drawings and are not intended to define or limit the scope of the invention. In the drawings and the following description below, the same reference number refers to the same component between drawings.

FIG. 1 is a cross-sectional depiction of and embodiment of the adhesive grip liner of the present invention. The adhesive grip liner 10 includes a foam sheet material 20, having a top surface and a bottom surface. The foam sheet material may be a composite sheet material. An adhesive layer 30 is applied to the bottom surface of the foam sheet material 20. A release liner 40 may be a disposable liner with a release coating 42 on one side; the side with the release coating 42 contacts the adhesive 30. However, a release coating may not be needed in all embodiments and its depiction should not be construed as requiring one.

The foam sheet material 20 used in the adhesive grip liner of the present invention is described in U.S. Pat. No. 6,911,406. Generally, it is a composite sheet material comprising a scrim impregnated with a foamed resin having a non-skid surface characteristic. It may also be a foam sheet material which incorporates a resinous or fibrous material. The fibrous material provides strength, resistance to ripping, and dimensional stability.

The scrim can be formed from natural fibers, synthetic fibers, or mineral fibers. Fibers comprised of cotton, polyester, or fiberglass are examples of the fibers which can be utilized to form the scrim used in the invention.

The scrim can be woven or non-woven. Preferably, the scrim is a woven scrim having a weave, which provides a decorative effect to preferably the top surface of the composite sheet. The weave of the scrim must be close enough so that when the scrim is impregnated with the foamable resin composition before foaming, the composition can penetrate into the weave and fill the spaces between the warp and the weft strands and so that when the impregnated composition is foamed no open pores extend from one surface of the sheet material to the opposite surface. The strands can be spun or can be mono-filament. Preferably, the strands are synthetic spun strands and preferably are comprised of polyester.

Preferably, the scrim is woven in a manner which, when impregnated with the resin composition and foamed, provides a pleasant or decorative surface to the composite sheet material due to the outline of the weave which shows or is telegraphed through the surface of the foamed resin. Weaves such as plain weave, twill weave, herringbone weave, tick weave and the like are simple weaves which can be utilized to form a scrim useful in the practice of the present invention. However, more complex weaves can be utilized to obtain different decorative effects.

As used herein the term continuous coating of foamed resin refers to a coating which does not contain pores which extend from a first surface to an opposite second surface through the foamed resin.

The scrim can be formed from non-woven fibers as long as its fibers are arranged closely enough so that, when the scrim is impregnated with resin and the resin is foamed, no open pores extend from one side of the scrim to the other.

In addition to acting as a carrier or support for the foamable resin composition during manufacture and influencing the surface appearance of the composite sheet material, the scrim also functions to increase the tensile strength and tear resistance of the composite sheet material and the resulting adhesive grip liner.

The resin can be foamed under constraints which have a leveling or smoothing effect on one or both surfaces of the foamed resin. The foaming of the resin can be constrained by pressing the impregnated scrim against a hot roll or other smooth surface. The resin foams, but contact with the surface constrains the expansion of the foam in the direction of the surface. This creates a surface in which the impression of the scrim showing through the foamed plastic is substantially reduced to provide a much smoother surface. The smoothness of the surface which is foamed under constraint can range from a surface with few indentations to a surface which approaches the appearance of a surface which has been foamed without constraints. Another method of providing a smoother surface is to press a surface of the composite sheet against a surface, preferably a smooth surface, before the foam has set. This can be done by pressing a side of hot-foamed composite sheet against a hot or cool surface. When the resin does not require heat to foam, the surface against which the composite sheet is pressed need not be heated. Pressing after foam formation does not provide as smooth a surface as constraint during foaming. If desired, the surface against which the composite sheet is pressed can contain a pattern which becomes embossed in the surface of the composite sheet. The top surface of the composite sheet material may be smoothed or decorated as desired. The bottom surface, to which adhesive is applied, is preferably smooth.

The term smooth is used to contrast the surface of the composite in which the foaming has been inhibited or pressed before setting with the surface in which the foaming has not been inhibited or pressed before setting. The surface, which has been foamed under conditions in which the foam expansion has been inhibited, can contain small irregularities due to the pressure which may be applied between the composite and the smooth surface. However, these surfaces under which the expansion of the foam has been inhibited displays a lower shadowing or showing through of the outline or pattern of the scrim.

In manufacturing the composite sheet, the scrim is impregnated with a liquid foamable resin composition. The liquid foamable resin composition can be an emulsion of a foamable composition in water, a solution of the foamable composition in an organic material or a foamable plastisol. The composition must be a liquid which has a viscosity such that the scrim can be impregnated.

The foamable liquid resin composition is applied to the scrim by known means such as dipping, roller coating, spraying, knife coating and the like. The thickness of the foamable resin composition on the surface of the scrim can be controlled by means such as a knife or by passing the impregnated scrim between rollers which are preset at a distance so that excess foamable resin composition is removed. The impregnated scrim material is then passed through a heating zone if heat is required to foam the resin. If the liquid foamable resin composition is an emulsion, the water in the emulsion is first evaporated and further heating causes the resin to foam and set. If the foamable composition is a solution of the foamable resin composition in an organic solvent, the organic solvent is first removed in the heating zone and the resin foamed and set. A preferred material is an organic plastisol, such as a plastisol having a foaming agent incorporated in the composition. Latent foaming agents (i.e., foaming agents which are stable at room temperature but which are activated by heating to an elevated temperature) as well as physical foaming agents (e.g., gases and volatile hydrocarbons or halocarbons) may be employed. The plastisol is impregnated into the scrim and the impregnated scrim is then heated in the heating zone to foam and gel the resin composition. A preferred material is a polyvinyl chloride (PVC) plastisol containing a foaming agent and the usual plasticizers, stabilizers, antioxidants, fillers, pigments, dyes and the like which are generally included in PVC compositions. Foamable polyurethanes may also be utilized and foaming can be accomplished at lower temperatures. Where the composite sheet structure is to be used as a shelf liner or the like, it will generally be advantageous to select a resin for use in impregnating the scrim which will provide a skid-resistant bottom surface on the composite sheet material. The foamed resin thus desirably has a coefficient of friction which is sufficiently high so as to prevent the composite sheet material from sliding on the horizontal surface to which it is applied.

The impregnated scrim is passed through a means which ensures that the proper amount of the foamable resin composition has been applied to the scrim. Means such as knife blades, rolls and the like can be utilized to ensure that excess foamable resin composition is not adhered to the scrim.

If the foamable resin composition is in the form of an emulsion in water, the impregnated scrim is passed through an oven to dry the resin composition and through a heating and foaming zone where the resin composition applied to the scrim is heated to a temperature to activate the foaming agent and foam and gel, cure or polymerize the resin.

The impregnated scrim can be carried through the heating zone on a tenter frame or other means, which provides for foaming the resin composition without hindering the expansion of the foam. In an alternate embodiment, an impregnated scrim can be pressed against a smooth surface to inhibit foam expansion; the smooth surface can be heated to cause the resin composition to foam and gel or polymerize. When the impregnated scrim is pressed against a smooth surface and foamed, the surface of the scrim after foaming becomes much smoother than the surface of the scrim on which foaming was not inhibited. This method permits the formation of a composite material having a relatively smooth surface on a first side and a decorative surface on the second side which reflects the character of the scrim weave. The outline of the scrim carrying through the foam layer can provide an interesting decorative appearance to the composite sheet structure.

Although the preferred embodiment uses a scrim embedded in a foamed resin, a foam sheet is also contemplated. In this form, the foam is deposited on a surface which acts as a carrier for the foam while it forms and sets. For example, the carrier may be a plastic surface. The carrier performs the same function as the scrim, except that after the foam sheet is formed it may be separated from the carrier. The processes above would apply equally to the foam sheet.

Figure 2:
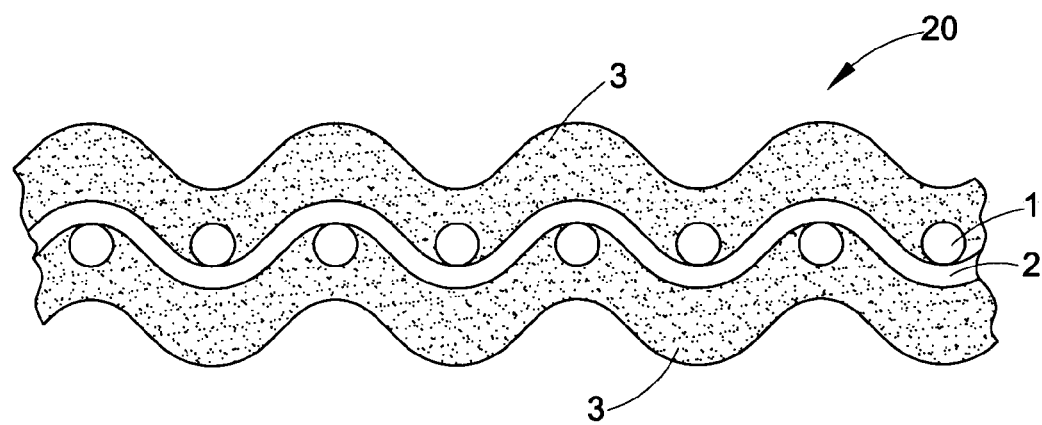
FIG. 2 is a cross sectional view of one embodiment of the composite sheet material used in the adhesive grip liner.

FIG. 2 is a cross sectional view of one embodiment of the foam sheet material 20 used in the adhesive grip liner, through the warp and weft of the scrim. Here, the warp 1 and the weft 2 have a plain weave pattern. The foamed resin material 3 impregnates the scrim. In this embodiment, both the upper and lower surfaces of the composite structure show the outline of the fibers or yarns forming the scrim.

Figure 3:
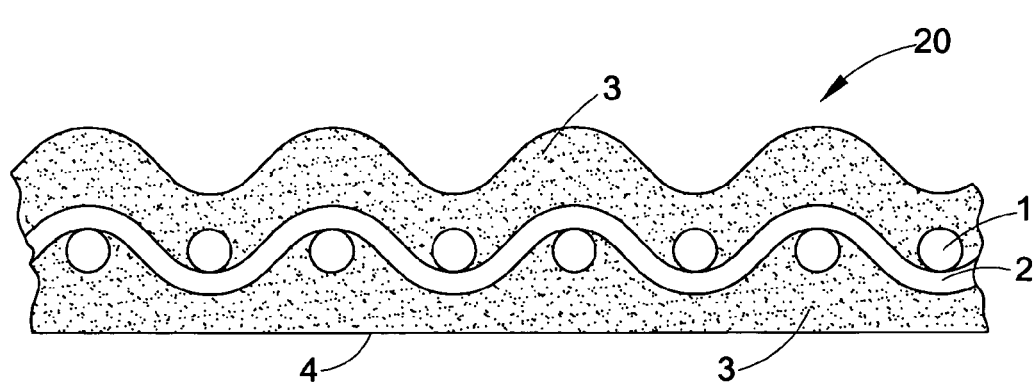
FIG. 3 is a cross sectional view of a second embodiment of the composite sheet material used in the adhesive grip liner wherein the bottom surface of the composite sheet material is flat.

FIG. 3 is a cross section of a composite sheet wherein the scrim is a plain weave formed from warp fibers 1 and weft fibers 2. The scrim has been impregnated with a foaming composition and the composition has been foamed to provide a foamed coating 3. As noted, the lower side 4 of the composite structure shown in FIG. 3 is flat. With regard to the adhesive grip liner, the main difference between the composite sheets of FIGS. 2 and 3 is that the bottom surface of the composite sheet of FIG. 3 will require less adhesive to be applied to it; either composite sheet is suitable for use in the adhesive grip liner.

The composite sheet can have a thickness in the range of from about 45 mils to about 150 mils and preferably from about 55 mils to about 100 mils. The thickness of the composite is dependent upon the nature of the scrim in relation to the weave and thickness, the quantity of foamable resin composition impregnated on the scrim, the type and amount of foaming agent, and to any force which has been applied to inhibit expansion of the foam. The thickness of the composite sheet structure and the type of scrim and foamable resin composition employed are usually selected such that a relatively flexible sheet is obtained which is capable of conforming closely to and gripping a surface to which the composite sheet structure is applied with little or no curling. In other embodiments, however, a thicker, less flexible composite sheet structure may be more desirable (e.g., where the composite sheet structure is used as a covering for wire shelving).

Decorative patterns or designs may be added to the top surface of the composite sheet by printing methods or the like. The foamed resin may be colored using a suitable pigment or dye.

The foamed resin is preferably resilient, flexible, soft, and provides non-skid and non-adhesive properties to the top surface of the composite sheet (and therefore the adhesive grip liner). Preferred resins are foamed polyurethanes, foamed polyvinyl chloride plastisols, and foamed polyvinyl acetates. Thermoplastic as well as thermoset resins may be utilized.

An adhesive layer 30 connects to the bottom surface of the foam sheet material 20. The adhesive used in the adhesive layer may be permanent, removable, or repositionable. As used herein, the term "permanent adhesive" refers to an adhesive which adheres to a substrate more strongly than the substrate coheres to itself so that the substrate is damaged or destroyed before the adhesive is removed from it, or to an adhesive that adheres to a substrate more strongly than the adhesive coheres to itself so that the adhesive breaks up and remains on the substrate. The term "removable adhesive", as used herein, refers to an adhesive that coheres to itself more strongly than it adheres to a substrate, so that it can be removed, but does not necessarily maintain its adhesive properties after removal from the substrate. The term "repositionable adhesive", as used herein, refers to an adhesive that coheres to itself more strongly than it adheres to a substrate, so that it can be removed, but which does maintain its adhesive properties after removal from a substrate so that it can be reused on at least a second substrate. The terms "adhere" and "adhesive properties", as used herein, refer to the affinity of an object, such as a substrate or an adhesive, to stick to another object. The term "cohere", as used herein, refers to the affinity of an object to stick to itself. Alternatively, a removable or repositionable adhesive also has the property of forming a strong bond with the layer of the adhesive grip liner it contacts and a weak bond with the substrate to which the grip liner is applied. It also forms a weak bond with the release liner.

The adhesive used in the adhesive layer is preferably a pressure sensitive adhesive and provides a bond between the adhesive grip liner and the substrate to which it is applied. Pressure sensitive adhesives can be modified and/or selected to provide a suitable amount of adhesion yet provide an adhesive grip liner which can be repositioned and easily moved.

The adhesive preferably has a shear load of 0.005 to 0.02 MPa and a peel load of 300 to 600 N/m. The adhesive is generally applied at the rate of from about 1.5 lbs/ream to about 14 lbs/ream and preferably from about 5 lbs/ream to about 13.5 lbs/ream. The term ream as used herein refers to 3000 square feet of composite sheet material. When applied, the adhesive layer can have a thickness of from about 1 mil to about 15 mils; in preferred embodiments, the adhesive is from about 5 mils to about 10 mils thick, and in a specific embodiment, the adhesive is about 7.5 mils thick.

The adhesive layer can be applied to the adhesive grip liner using conventional methods known in the art. For example, the adhesive may be applied to the release liner and then connected to the composite sheet. It may also be applied or fixed to the bottom surface of the composite sheet material. Because the adhesive forms a stronger bond with the composite sheet than the release liner, the adhesive layer remains fixed to the composite sheet when the release liner is removed.

In other embodiments, a tie coating, or primer, may be applied to the bottom surface prior to applying the adhesive in order to improve adhesion between the adhesive and the bottom surface. Other layers may also be applied between the bottom surface of the composite sheet and the adhesive layer.

Figure 4:
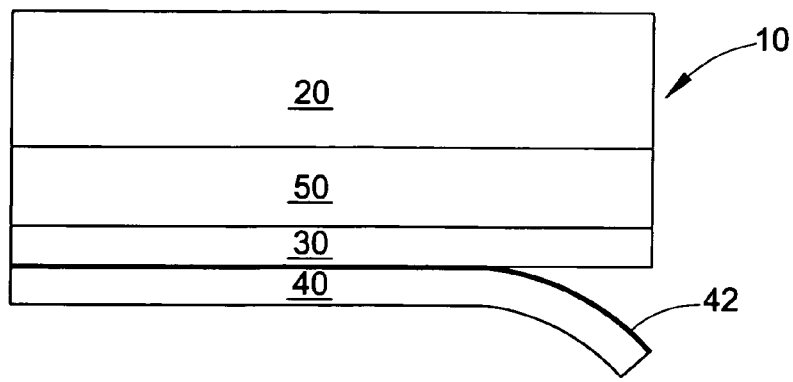
FIG. 4 is a cross-sectional view of a third embodiment wherein a solid vinyl film is placed between the composite sheet and the adhesive layer.

In a specific embodiment, a solid vinyl film is directly connected to the bottom surface of the composite sheet and the adhesive layer is then connected to the bottom surface by this film layer. FIG. 4 is a cross-sectional view of this exemplary embodiment. Here, a vinyl film layer 50 is present between the composite sheet 20 and the adhesive layer 30. The vinyl film layer may be joined to the bottom surface of the composite sheet by conventional methods, such as by lamination.

The adhesive may also be applied as a continuous layer across the bottom surface of the composite sheet or by an intaglio or printing method which provides islands of the adhesive over the bottom surface of the composite sheet. It may also be applied discontinuously, i.e. to only discrete areas of the bottom surface, to form a discontinuous layer. Generally, the adhesive layer is applied in a thickness such that the resulting surface formed is generally smooth.

Figure 5:
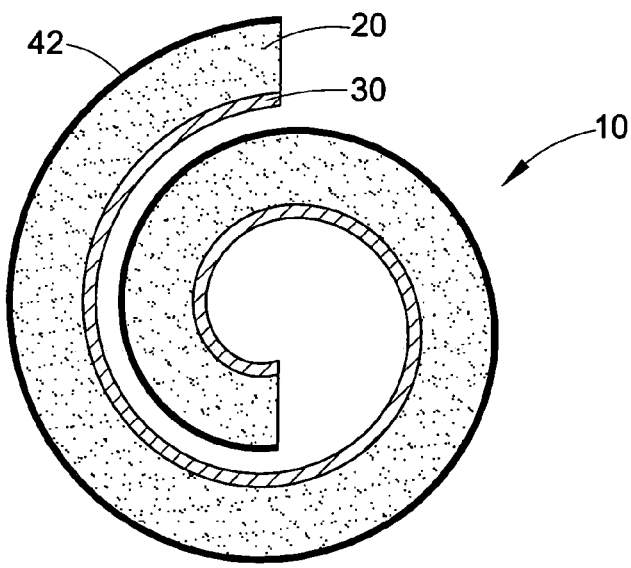
FIG. 5 is a drawing of a fourth embodiment of an adhesive grip liner in rolled-up form.

A release liner 40 contacts the adhesive. A release liner, especially a removable release liner, may comprise a disposable liner with a release coating 42 applied to a surface of the disposable liner. The surface with the release coating applied to it contacts the adhesive layer 30. The release liner may be any disposable liner and release coating conventionally known in the art and compatible with the selected adhesive. For example, the disposable liner may be paper or polymeric. In another embodiment which takes advantage of the fact that the adhesive grip liner may be sold commercially in a rolled-up form, the top surface replaces the disposable liner portion of the release liner. Instead, a release coating is applied to the top surface of the composite sheet material. The adhesive grip liner is then wound up into a roll so that the adhesive contacts the top surface of the composite sheet material. FIG. 5 is a drawing of this embodiment of an adhesive grip liner in rolled-up form. Release coating 42 is applied to the top surface of the composite sheet 20. When the grip liner is rolled up, the adhesive layer 30 contacts the release coating 42 of the grip liner beneath it. In this embodiment, the adhesive is usually a repositionable adhesive. The top surface, then, acts as the release liner.

Figure 6:
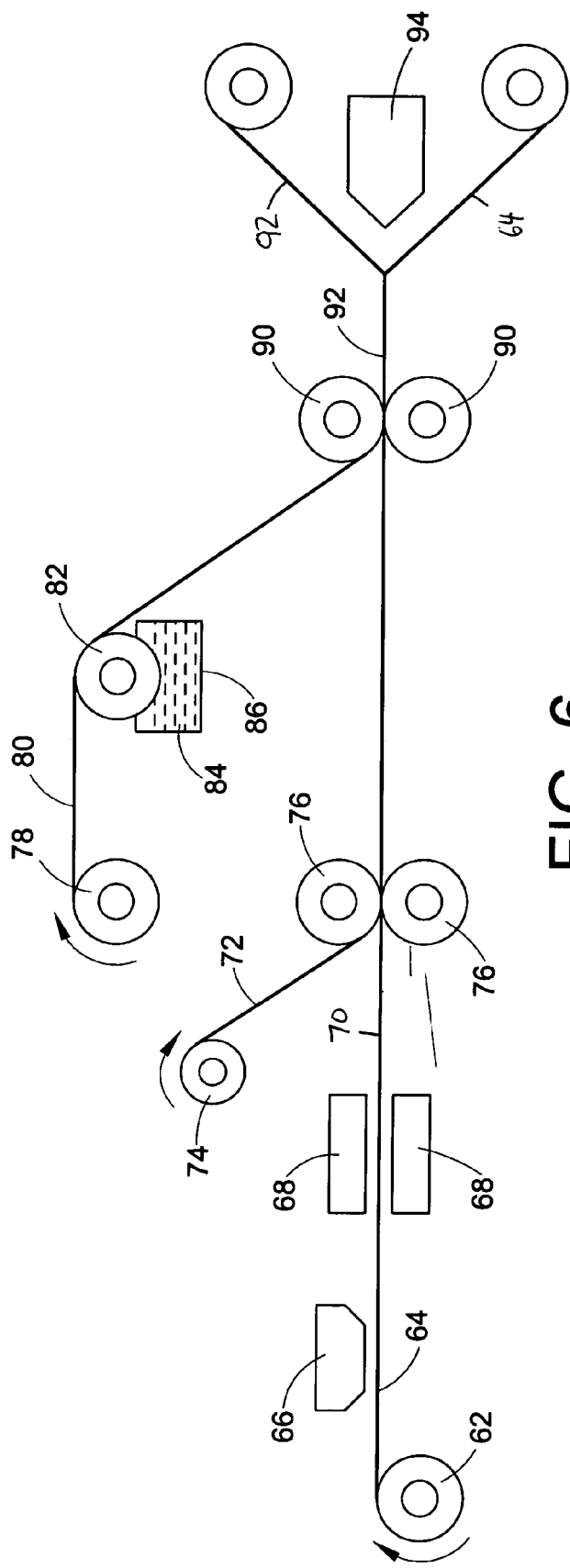
FIG. 6 is a diagram of a method and apparatus for manufacturing the adhesive grip liner.

A method of manufacturing the adhesive grip liner is shown in FIG. 6. A carrier supply roll 62 is driven to supply a carrier 64. The carrier may be a scrim. The carrier passes over a foamable resin supply means 66 which applies a foamable resin composition. Here, the resin is on "top" of the carrier 64. If the carrier is a scrim, it is preferably impregnated with the resin composition. The resin is then foamed in, for example, an oven 68, to make a foam sheet material 70. If the carrier is a scrim, a composite sheet material results. If desired, a vinyl film 72, supplied by a vinyl film supply means 74, may be joined to the bottom surface of the foam sheet material or composite sheet material by pinch rollers 76. A liner supply means 78 supplies liner 80 which passes over and in contact with an adhesive transfer roller 82. The adhesive transfer roller 82 picks up adhesive 84 from an adhesive supply 86 and applies it to the liner. The liner, with applied adhesive, is then connected to the bottom surface by pinch rollers 90 to form an adhesive grip liner 92. If necessary, the carrier may then be removed from the adhesive grip liner by a separating means 94; if the carrier is a scrim, there is no such need.

Figure 7:
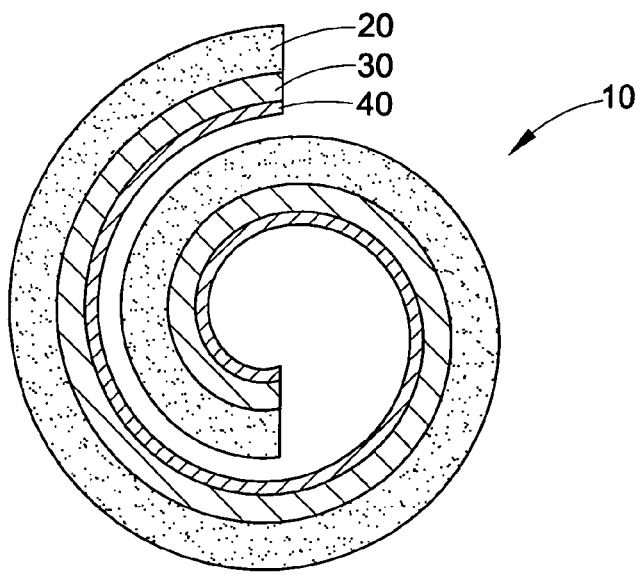
FIG. 7 is a drawing of an adhesive grip liner in rolled up form.

The adhesive grip liner is a commercial consumer product. It may be sold as a roll having suitable dimensions; the roll may then be unwound into a flat sheet and cut to any desired size and shape by the consumer. FIG. 7 depicts the adhesive grip liner in a rolled-up form; obviously, in commercial forms, the adhesive grip liner would be rolled up more than is shown here. The adhesive grip liner may also be sold as a sheet. If desired, the grip liner could be sold with precut shapes in it.

The adhesive grip liner may be used in several ways by a consumer. For example, the grip liner could be used as a shelf liner upon which objects such as cups, glasses, and plates may be placed. Because the top surface is non-skid, the grip liner prevents them from falling off of or inadvertently moving across the shelf. Because the bottom surface is coated with adhesive, the liner is fixed in place. Additionally, because the grip liner is adhered to the shelf, crumbs or other debris accumulating on the shelf can be cleaned away with a vacuum cleaner.

The grip liner could also be used as a drawer liner. When applied to the bottom of a drawer, it would prevent objects from moving laterally, for example when the drawer is hastily opened. It would also cushion objects which are dropped into the drawer. Because the grip liner has an adhesive on the side in contact with the drawer, it is securely fixed in place and will not move or become bunched along an edge. Some embodiments of the grip liner may also be stretched a little bit to cover the drawer bottom if the grip liner was cut a little bit too short in one dimension; the adhesive would then keep it in place.

Alternatively, the grip liner could be mounted to an object to keep it from sliding along a slick surface. For example, the grip liner could be applied to the bottom of knickknacks on a glass table to keep them from sliding along the glass and to protect the glass surface.

The grip liner may be mounted on vertical surfaces and used for its cushioning effect. For example, the grip liner could be mounted on the rail of a staircase. The liner would be cut into a long strip having a width that at least partially surrounds the rail. The release liner would then be removed and the strip adhered to the rail. The rail is thus provided with a surface allowing someone to comfortably and securely grip the rail due to its cushioning end characteristic. Alternatively, the grip liner could be mounted on an object having sharp corners, such as a desk or table, and cushion any contact with that corner. The grip liner might also be applied to, for example, a door bottom and cushion the door bottom if it is kicked/nudged closed with a foot or if it strikes the wall. In any of these uses, a permanent or repositionable adhesive would be appropriate for the grip liner.

The grip liner could also be mounted to another material to give that material a non-skid, non-adhesive, cushioned surface. The adhesive surface of the grip liner could be applied to, e.g., a felt pad, and would join the grip liner and felt pad, preventing them from being separated. The felt pad could then be placed on top of a table, e.g. to play poker. The non-skid characteristic of the grip liner would prevent the felt pad from moving and the water-impervious nature of the grip liner would protect the table from water stains, such as from drinking cups used during poker play. When it is desired to put the felt pad away, the non-adhesive and flexible nature of the grip liner would allow the felt pad to be easily removed from the table and conveniently stored away.

Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. An adhesive grip liner, comprising:
   a composite sheet material comprising a scrim embedded in a continuous coating of a foamed resin, the composite sheet having foamed resin forming an exterior top surface and a bottom surface;
   wherein the foamed resin is selected from the group consisting of foamed polyvinyl chloride plastisols, foamed polyurethanes, and foamed polyvinyl acetates; and
   a repositionable adhesive connected to the bottom surface of the composite sheet material.

2. The adhesive grip liner of claim 1, wherein the foamed resin is a foamed polyvinyl chloride plastisol.

3. The adhesive grip liner of claim 1, wherein the top surface of the composite sheet is smooth.

4. The adhesive grip liner of claim 1, wherein the top surface displays the underlying weave pattern of the scrim.

5. The adhesive grip liner of claim 1, wherein one or more apertures are formed on the top surface of the composite sheet.

6. The adhesive grip liner of claim 1, wherein the top surface has non-skid and non-adhesive characteristics.

7. The adhesive grip liner of claim 1, wherein the top surface is impervious to water.

8. The adhesive grip liner of claim 1, wherein the adhesive is a pressure-sensitive adhesive.

9. The adhesive grip liner of claim 1, further comprising a release liner contacting the adhesive, wherein the release liner comprises a disposable liner with a release coating applied to a surface of the disposable liner, said surface contacting the adhesive.

10. The adhesive grip liner of claim 9, wherein a release coating is applied to the top surface of the composite sheet and the top surface acts as the release liner; and,
   the release coating contacting the adhesive wherein the grip liner is in rolled-up form.

11. The combination of a horizontal surface and the adhesive grip liner of claim 1.

12. The combination of a vertical surface and the adhesive grip liner of claim 1.

13. The adhesive grip liner of claim 1, having a cushioning effect.

14. The adhesive grip liner of claim 1, further comprising a vinyl film layer placed between the composite sheet material and the adhesive, the vinyl film layer providing a solid film barrier between the adhesive layer and the composite sheet material.

15. A non-skid grip liner, comprising:
   a foam sheet material including a continuous coating forming an exterior top surface and a bottom surface, said top surface having a non-skid characteristic thereby preventing an object placed thereon from skidding laterally across said top surface;
   a scrim embedded in the foam sheet material;
   the foamed sheet material is selected from the group consisting of foamed polyvinyl chloride plastisols, foamed polyurethanes, and foamed polyvinyl acetates;
   a pressure sensitive adhesive layer connected to the bottom surface of the foam sheet material for repositionable mounting to a substrate; and4
   a removable release liner protecting said adhesive layer.

16. The grip liner of claim 15, wherein the top surface also has a non-adhesive characteristic.

17. The grip liner of claim 15, wherein a vinyl film layer is present between the foam sheet material and the adhesive layer.

18. The grip liner of claim 15, wherein the adhesive layer comprises a pressure-sensitive adhesive.

19. The grip liner of claim 15, wherein the removable release liner comprises a disposable liner with a release coating applied to a surface of the disposable liner, said surface contacting the adhesive.

20. An adhesive liner, comprising:
   a carrier, an adhesive, and a liner;
   a foamable resin composition applied to the carrier;
   the foamable resin composition foamed to obtain a continuous coating layer of foam sheet material forming and extending between a bottom surface and a non-porous exterior top surface;
   the top surface includes a non-skid surface preventing objects from skidding laterally across the top surface;
   the adhesive applied to the liner; and,
   the adhesive connected to the bottom surface to form an adhesive grip liner.

21. The adhesive liner of claim 20, wherein the carrier is a scrim and the foamable resin composition impregnates the scrim.

22. The adhesive liner of claim 20, further comprising
   a vinyl film intermediate the bottom surface and the adhesive.

23. The adhesive liner of claim 20, wherein the adhesive is selected from the group consisting of removable adhesive and repositionable adhesive.

24. An adhesive liner, comprising:

a scrim, an adhesive, and a liner;

a foamable resin composition applied to and impregnating the scrim;

the foamable resin composition foamed to obtain a continuous coating layer of foam sheet material forming and extending between a bottom surface and a non-porous exterior top surface;

the top surface includes a non-skid surface preventing objects from skidding laterally across the top surface; and, the adhesive connected to the bottom surface.

25. The adhesive liner of claim 24, wherein the foamable resin composition is selected from the group consisting of foamed polyvinyl chloride plastisols, foamed polyurethanes, and foamed polyvinyl acetates.

* * * * *